(12) United States Patent
Marusiak

(10) Patent No.: US 9,969,011 B1
(45) Date of Patent: May 15, 2018

(54) VISE FIXTURE

(76) Inventor: Frank Marusiak, Annandale, NJ (US)

( * ) Notice: Subject to any disclaimer, the term of this patent is extended or adjusted under 35 U.S.C. 154(b) by 467 days.

(21) Appl. No.: 13/573,102

(22) Filed: Aug. 21, 2012

Related U.S. Application Data

(60) Provisional application No. 61/575,440, filed on Aug. 22, 2011.

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01); *Y10T 408/563* (2015.01); *Y10T 408/567* (2015.01)

(58) Field of Classification Search
CPC .............. B23B 47/287; B23B 2247/10; B23B 2247/12; Y10T 408/567; Y10T 408/563
USPC ............................................... 408/103, 115 R
See application file for complete search history.

(56) References Cited

U.S. PATENT DOCUMENTS

| | | | | |
|---|---|---|---|---|
| 1,128,970 A * | 2/1915 | Godefroy et al. | ............... | 408/97 |
| 2,315,318 A * | 3/1943 | Deubler, Jr. | ............ | B23B 47/28 408/97 |
| 2,338,471 A * | 1/1944 | Vanerstrom | ............. | B25B 1/103 269/248 |
| 2,402,537 A * | 6/1946 | Downing | ................. | B23Q 3/00 408/103 |
| 2,407,769 A * | 9/1946 | Anderson | ............... | B23B 47/28 269/71 |
| 2,507,288 A * | 5/1950 | Wagner | ..................... | B25B 1/24 269/207 |
| 2,556,131 A * | 6/1951 | Wolfson | .................. | B23B 47/28 269/268 |
| 2,576,801 A * | 11/1951 | Michael | ............... | G04D 3/0002 269/249 |
| 2,643,563 A * | 6/1953 | Gaudreau | ............... | B25B 1/103 269/218 |
| 2,847,883 A * | 8/1958 | Bagby | ..................... | B23B 47/28 408/105 |
| 3,065,656 A * | 11/1962 | Clinkenbeard | ......... | B23B 39/00 269/85 |
| 3,313,188 A * | 4/1967 | Abernethy | .............. | B23B 47/28 408/97 |
| 3,341,190 A * | 9/1967 | Adamson | .............. | B25B 1/2405 269/271 |

(Continued)

FOREIGN PATENT DOCUMENTS

| DE | 2437724 A1 * | 2/1976 | ........... B23B 47/288 |
|---|---|---|---|
| DE | 2729304 A1 * | 1/1979 | ........... B23B 47/288 |
| DE | 4127679 A1 * | 2/1992 | ........... B23B 47/288 |

OTHER PUBLICATIONS

Amazon /woodworking bench vise online search results as of Feb. 28, 2015 showing some typical woodworking vises (4 relevant pages).

(Continued)

*Primary Examiner* — Eric A Gates

(57) ABSTRACT

An improved pocket hole drill guide fixture. The fixture may be retrofitted onto a vise or incorporated as an integral part thereof. The fixture provides a broad clamping surface and a long top edge providing linear area for drill guide bores housed therein. Each bore enters the top edge at a known angle and exits towards the work contacting surface of the fixture. One or more workpieces per clamping cycle can be efficiently produced.

6 Claims, 12 Drawing Sheets

(56) References Cited

U.S. PATENT DOCUMENTS

| | | | | |
|---|---|---|---|---|
| 3,584,863 | A | * | 6/1971 | Ryswick ............... B25B 1/2452 269/245 |
| 3,866,897 | A | * | 2/1975 | Whalen, Jr. ........... B25B 1/2405 269/258 |
| 3,980,287 | A | * | 9/1976 | Nilsson .................. B23B 47/28 269/110 |
| 4,437,654 | A | * | 3/1984 | Chiappetti ............ B25B 1/2452 269/283 |
| 4,443,138 | A | * | 4/1984 | Butera ................... B23B 47/28 408/103 |
| 4,594,032 | A | * | 6/1986 | Warburg .................... 408/115 R |
| 4,601,618 | A | * | 7/1986 | McEldowney ......... B23B 47/28 408/1 R |
| 4,669,926 | A | * | 6/1987 | Wilcox, Jr. .................... 408/1 R |
| 4,730,959 | A | * | 3/1988 | Aerni .................... B23B 47/288 408/103 |
| 4,955,766 | A | | 9/1990 | Sommerfeld |
| 5,063,982 | A | * | 11/1991 | Durney ......................... 144/365 |
| 5,118,228 | A | * | 6/1992 | Story ............................ 408/107 |
| 5,284,331 | A | | 2/1994 | Lee |
| 5,322,396 | A | * | 6/1994 | Blacker ................ B23B 47/287 408/72 R |
| 5,676,500 | A | * | 10/1997 | Sommerfeld ................. 408/103 |
| 5,775,856 | A | | 7/1998 | Woodard |
| 6,254,320 | B1 | * | 7/2001 | Weinstein et al. ............ 408/103 |
| 6,394,712 | B1 | * | 5/2002 | Weinstein et al. ............ 408/103 |
| 6,481,937 | B1 | * | 11/2002 | Sommerfeld et al. .... 408/115 R |
| 6,529,795 | B1 | | 5/2003 | Friedrich et al. |
| 6,637,988 | B1 | | 10/2003 | Park |
| 7,101,123 | B1 | * | 9/2006 | Weinstein et al. ............ 408/103 |
| 7,484,914 | B1 | * | 2/2009 | Weinstein et al. ........ 408/115 R |
| 7,597,513 | B2 | * | 10/2009 | Chiang .................... 408/115 R |
| 7,641,425 | B2 | | 1/2010 | Sommerfeld |
| 7,798,750 | B2 | * | 9/2010 | Clark .................... B23B 47/287 408/103 |
| 7,967,534 | B2 | * | 6/2011 | McDaniel et al. ........ 408/115 R |
| 8,083,443 | B1 | * | 12/2011 | Circosta et al. ............. 408/103 |
| 2005/0089381 | A1 | * | 4/2005 | Liu et al. .................. 408/115 R |
| 2008/0075546 | A1 | * | 3/2008 | Lin .......................... 408/115 R |

OTHER PUBLICATIONS

Amazon/online search results as of Feb. 28, 2015 showing typical vise type apparatus useable for woodworking (1 relevant page) Product Info confirms use as a bench vise.
Kreg® Tool Catalog vol. 32/2016, p. 17 (Copy Attached)
Kreg® Tool Catalog 17th Edition, Jan. 2005, p. 27 (Copy Attached).
McFeely's® Catalog Late Summer 2011 Master Catalog# MIHI p. 120. (Copy Attached).

* cited by examiner

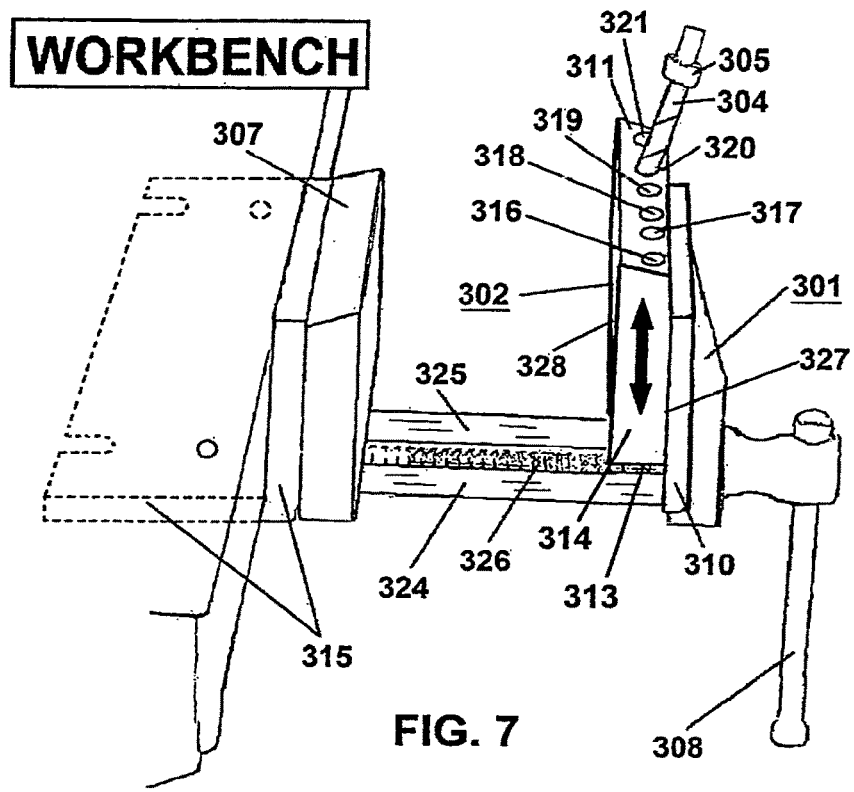
FIG. 7
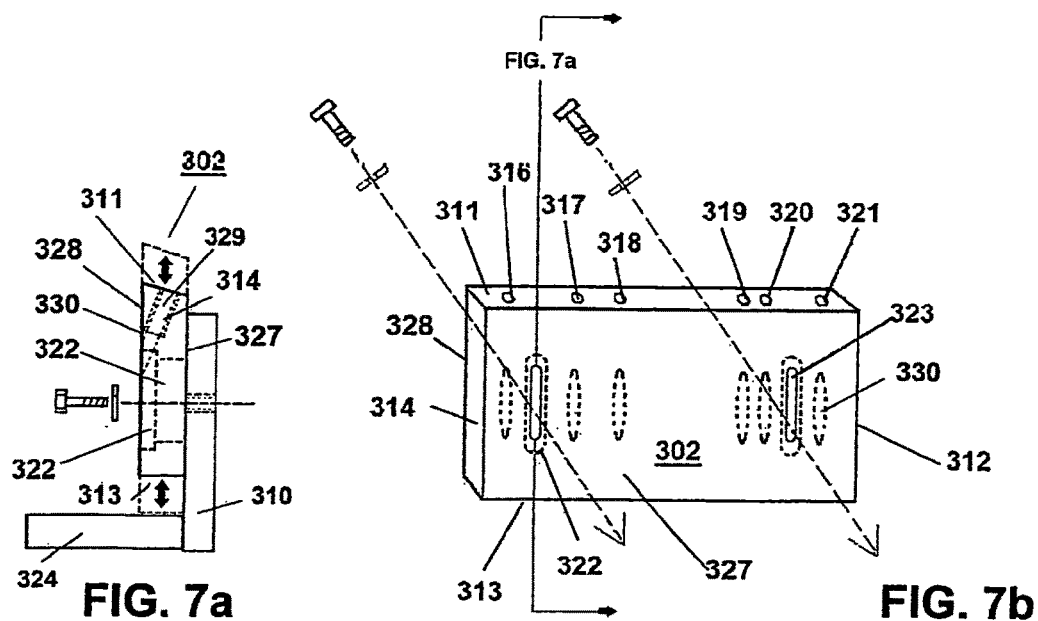
FIG. 7a
FIG. 7b

VISE FIXTURE

CROSS-REFERENCE TO RELATED APPLICATIONS

This application claims the benefit of provisional patent application Ser. No. 61/575,440 filed 2011 Aug. 22 by the present inventor.

FEDERALLY SPONSORED RESEARCH

Not Applicable

SEQUENCE LISTING OR PROGRAM

Not Applicable

BACKGROUND

Field

This application relates to pocket hole jigs combined with woodworking vises.

Prior Art

Both woodworking vises and pocket hole joinery have been known for centuries. The woodworking vise can be traced back to circa 1500 and the pocket hole technique has its roots in Ancient Egypt. Without qualification, "vise" usually refers to a bench vise with flat, parallel jaws, attached to a workbench. There are two main types: a woodworking vise and engineer's vise. The woodworker's bench vise main characteristic is its integration into the bench. An engineer's bench vise is usually clamped or bolted onto the top of the bench. For woodworking, the jaws are made of wood, plastic or from metal, in the latter case they are usually faced with wood to avoid marring the work piece. The top edges of the jaws are typically brought flush with the bench top by the extension of the wooden face above the top of the iron movable jaw. This jaw may include a dog hole to hold a bench dog. In modern metal woodworker's vises, a split nut is often used. The nut in which the screw turns is in two parts so that, by means of a lever, it can be removed from the screw and the movable jaw can be quickly slid into a suitable position at which point the nut is again closed onto the screw so that the vise may be closed firmly onto the work.

Pocket-hole joinery, or pocket-screw joinery, involves drilling a hole at an angle into one workpiece, and then joining it to a second workpiece with a self-tapping screw. The technique, in addition to doweling, has its roots in ancient Egypt. Egyptians clamped two workpieces together and bored a hole at an angle from the outside workpiece into the second workpiece. They then inserted a dowel with glue, and cut it off flush with the outermost surface. Today self tapping wood screws are typically used in place of the ancient pocket hole dowel technique.

Because of its simplicity and the efficiency made possible by today's pocket hole screws and modern jigs pocket hole joinery is perhaps more popular than ever. Recent prior art pocket hole jigs include U.S. Pat. No. 6,637,988; issued on Oct. 28, 2003; Inventor Joon Park (Glendale, Calif.) and U.S. Pat. No. 7,641,425; Issued on Jan. 5, 2010; Inventor Craig A. Sommerfeld et al (Kelly, Iowa). However despite their novel design these state of the art jigs have their limitations. The Park invention discloses a relatively complex device with numerous moving parts, the Sommerfeld jig is somewhat more simple but similar. Nevertheless both are small, portable jigs and therefore provide 3 closely spaced guide holes due to the narrow width of the surfaces which house the drill guides. Additionally due to their portable design they typically need to be attached or clamped to a workbench or other suitable work surface in order to remain stable during use, particularly when drilling pocket holes in larger panels. (i.e. cabinet parts) The limited number of guide holes also requires substantial repetitive motion and labor when boring pocket holes. Each time 2 or 3 holes are bored the jig clamp must be opened and re-tightened for the next piece, likewise the power drill must be repetitively put down and picked up again before proceeding to the next workpiece. The opening range of the clamping mechanisms of these jigs also limit the size of the workpieces which can be held within their grasp.

Sommerfeld has a long prior art history relative to pocket hole technology however the deficiencies discussed above remain.

The Sommerfeld patent history includes:
U.S. Pat. No. 4,955,766—Filed Nov. 6, 1989—Issued Sep. 11, 1990
U.S. Pat. No. 5,676,500—Filed Dec. 26, 1995—Issued Oct. 14, 1997
U.S. Pat. No. 6,481,937—Filed Aug. 23, 2000—Issued Nov. 19, 2002
U.S. patent application Ser. No. 10/170,932—Filed Jun. 13, 2002
U.S. patent application Ser. No. 11/104,276—Filed Apr. 12, 2005
U.S. patent application Ser. No. 11/947,722—Filed Nov. 29, 2007
U.S. Pat. No. 7,641,424—Filed Aug. 24, 2005—Issued Jan. 5, 2010
U.S. Pat. No. 7,641,425—Filed Apr. 12, 2005—Issued Jan. 5, 2010
U.S. Pat. No. 7,811,033—Filed May 22, 2008—Issued Oct. 12, 2010

Prior art U.S. Pat. No. 5,284,331; Issued on Feb. 8, 1994; Inventor Lenard G. Lee et al discloses a woodworking bench and related fixtures providing an integrated system of bench features, vises, dogs, panel clamps, hold-downs and fixtures that cooperate to provide a highly flexible workpiece holding and clamping apparatus able to accommodate a wide variety of shapes and sizes of workpieces. Part of the system incorporates dog holes in the top edge of both a twin screw vise and in the top edge of a single screw vise. These dog holes (along with dog pins) are designed to be used in cooperation with a matrix of dog holes in the workbench to provide an extremely versatile clamping capability. The holes in the top edge of these typical woodworking vises as disclosed by Lee are not drill guide holes and have no capability or purpose regarding pocket hole joinery, they are simply dog holes used for clamping.

SUMMARY

An improved pocket hole drill guide system is provided by combining a drill guide fixture with a woodworker's vise. The vise fixture for drilling pocket holes may be incorporated into a jaw pad retrofitted between the jaws of a vise or incorporated into or onto an actual jaw of the vise. Because a vise already provides all the work holding apparatus required the addition of a jig jaw pad or jaw jig allows virtually any vise to double as a pocket hole jig. Vises are by their very nature extremely robust work holding apparatus as such they provide superior clamping strength and construction when compared to other prior art pocket hole jigs. Additionally, woodworking vises typically open to work holding capacities ranging from 4 to 13 inches and have jaws ranging from about 4 to 10 inches wide, some even more. Larger jaw width can translate into faster pocket hole production, since more guide holes can be provided on a wider jaw or jaw pad than can be provided by a typical narrow range prior art pocket hole jig. The more pocket holes that can be drilled without re-clamping, relocating material and repetitively picking up and putting down the power drill the faster the production rate and the less motion and labor is wasted. Simply stated prior art pocket hole jigs have a workpiece cycle capable of producing one narrow workpiece at a time, this disclosure teaches how to produce more workpieces per cycle. It also teaches how to more easily produce pocket holes in larger panels with less cycle time and effort. The pocket hole jig disclosed herein has no effect on the normal and typical performance or use of a vise, therefore a vise can be used as usual or when needed as a high performance pocket hole jig.

DRAWINGS—FIGURES

FIG. 7 is a perspective view of the front side of an alternate embodiment jaw pad.

FIG. 7a is a perspective view of the same embodiment shown in FIG. 7 shown from the left side.

Figure 8:
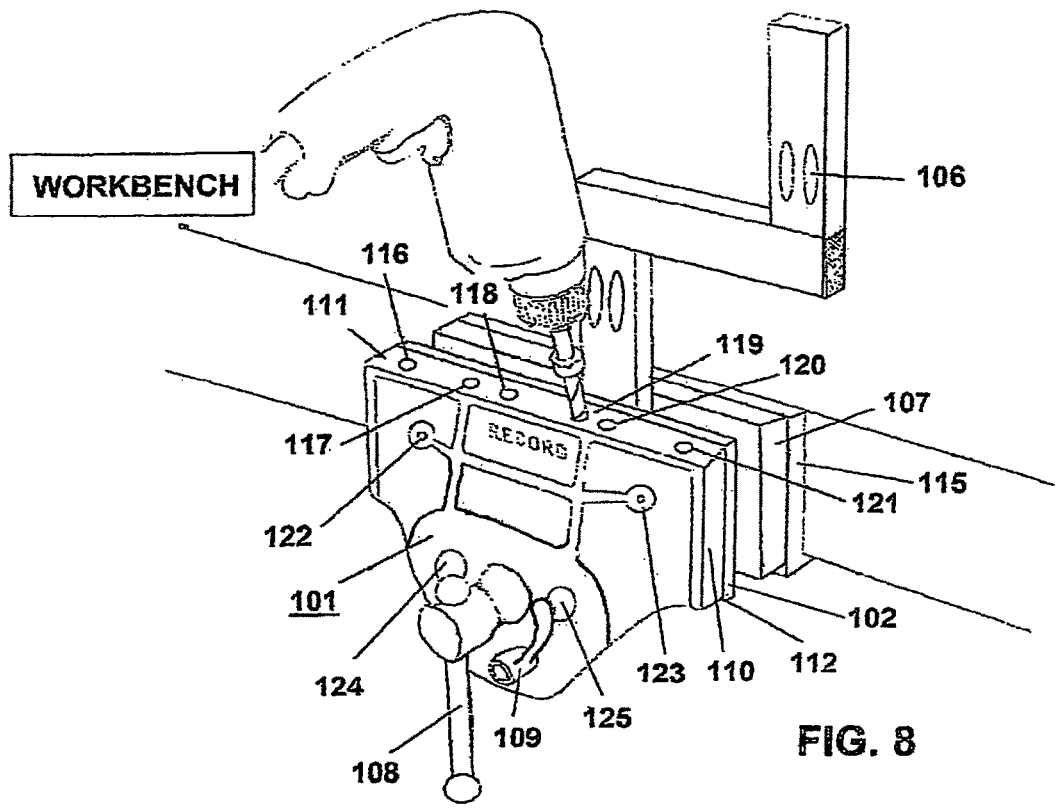
FIG. 8 is a perspective view of an alternate embodiment showing a combination woodworker's vise and pocket hole jig.
Figure 9:
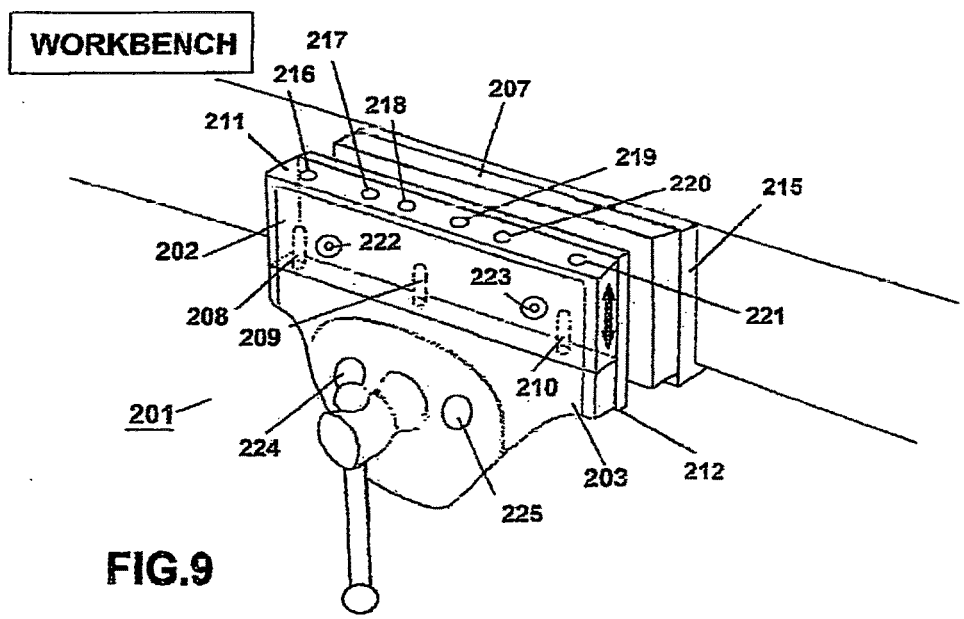
FIG. 9 is a perspective view of another alternate embodiment showing a combination woodworker's vise and an adjustable pocket hole jig.
Figure 10:
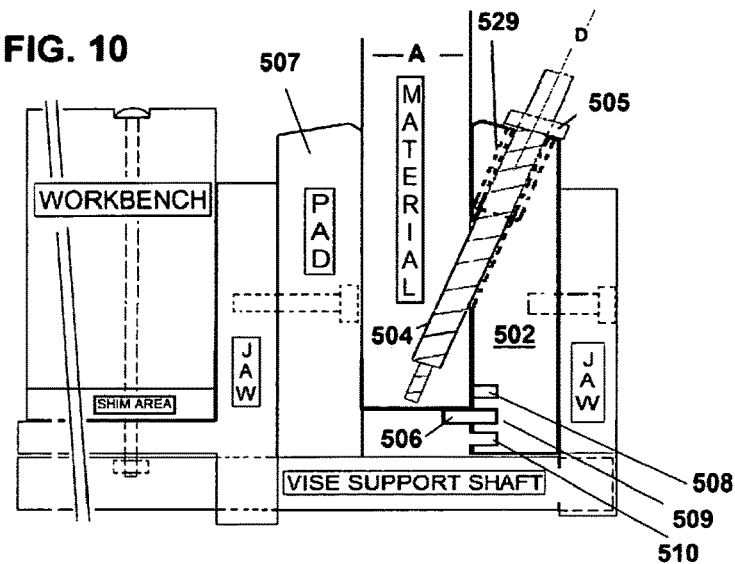
FIG. 10 is a side elevation of an alternate embodiment showing a work support groove.
Figure 11:
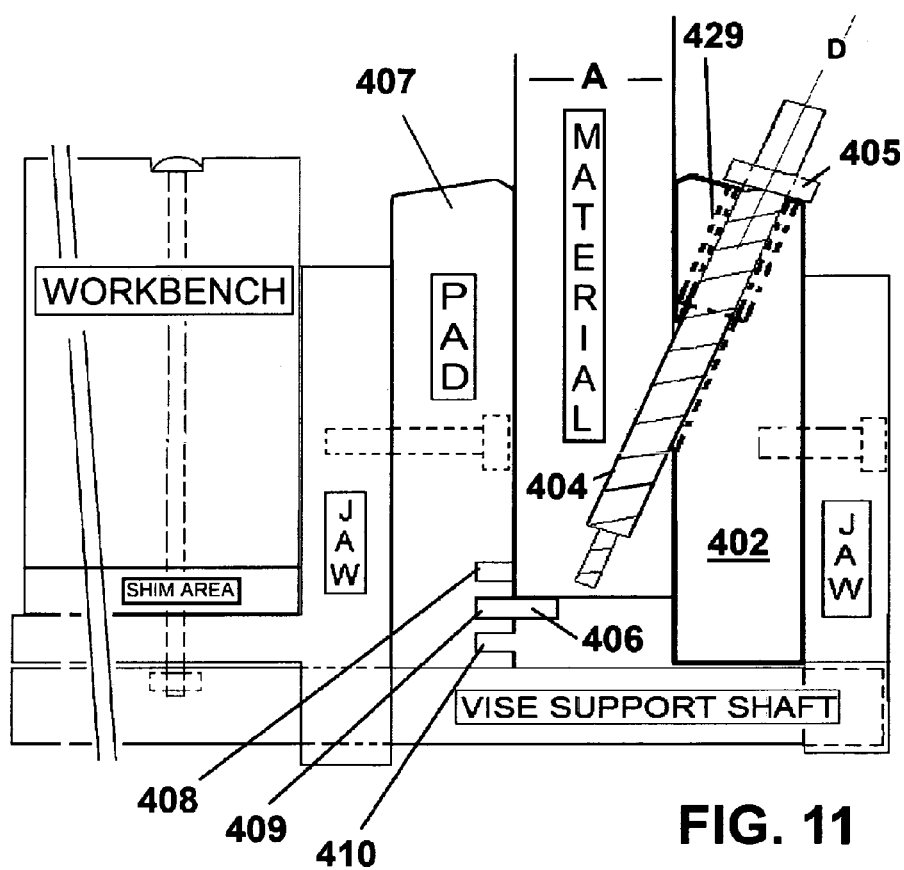
FIG. 11 is a side elevation of another alternate embodiment showing a jaw pad with a work support groove.
Figure 12:
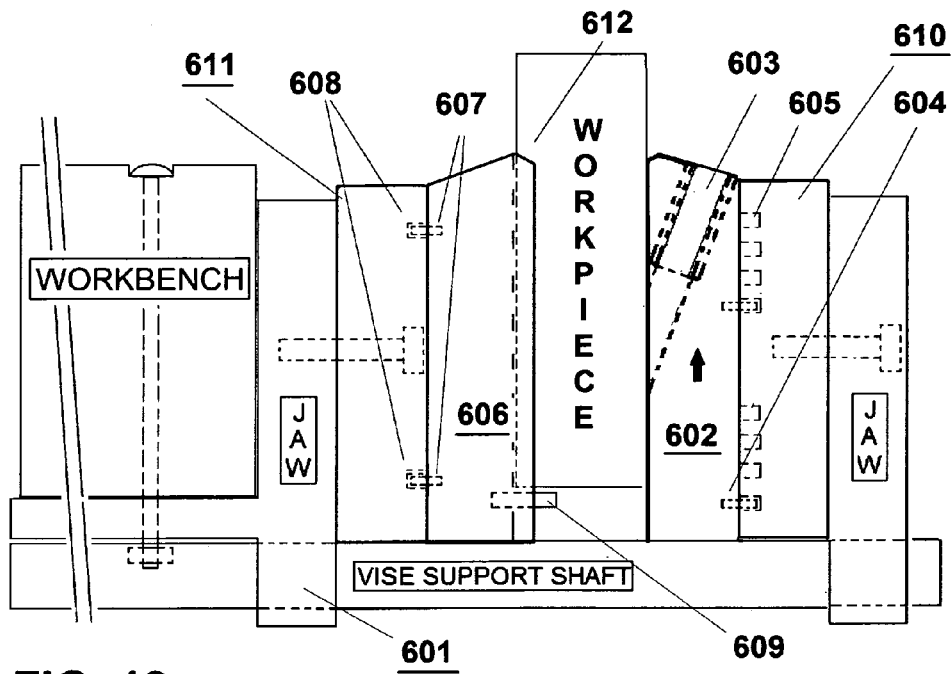
FIG. 12 is a side elevation showing alternate embodiment including primary vise jaw pads, an alternate work support and alignment system and an alternate jig jaw pad adjustment.

| DRAWINGS - Reference Numerals | | | |
|---|---|---|---|
| FIGS. 4-6c | | | |
| 1 | woodworker's vise | 2 | jig jaw pad |
| 3 | power drill | 4 | stepped drill bit |
| 5 | stop collar | 6 | pocket hole |
| 7 | jaw pad | 8 | vise handle |
| 9 | quick adjust lever | 10 | movable jaw |
| 11 | top edge | 12 | right side edge |
| 13 | bottom edge | 14 | left side edge |
| 15 | fixed jaw | 16 | drill guide bore |
| 17 | drill guide bore | 18 | drill guide bore |
| 19 | drill guide bore | 20 | drill guide bore |
| 21 | drill guide bore | 22 | jig jaw pad mounting hole |
| 23 | jig jaw pad mounting hole | 24 | left vise support shaft |
| 25 | right vise support shaft | 26 | main vise screw |
| 27 | front side | 28 | back side |
| 29 | drill bushing | 30 | exit hole |
| FIGS. 7 - 7a -7b | | | |
| 302 | jig jaw pad | 310 | movable jaw |
| 311 | top edge | 312 | right side edge |
| 313 | bottom edge | 314 | left side edge |
| 315 | fixed jaw | 316 | drill guide bore |
| 317 | drill guide bore | 318 | drill guide bore |
| 319 | drill guide bore | 320 | drill guide bore |
| 321 | drill guide bore | 322 | adjustment slot |
| 323 | adjustment slot | 324 | left vise support shaft |
| 325 | right vise support shaft | 326 | main vise screw |
| 327 | front side | 328 | back side |
| 329 | drill bushing | 330 | exit hole |
| FIG. 8 | | | |
| 101 | woodworker's vise | 106 | pocket hole |
| 110 | movable jaw | 111 | top jig edge |
| 112 | jaw pad | 115 | fixed jaw |
| 116 | drill guide bore | 117 | drill guide bore |
| 118 | drill guide bore | 119 | drill guide bore |
| 120 | drill guide bore | 121 | drill guide bore |
| 122 | jaw pad mounting hole | 123 | jaw pad mounting hole |
| 124 | left vise support shaft | 125 | right vise support shaft |
| FIG. 9 | | | |
| 201 | woodworker's vise | 202 | upper jaw section |
| 203 | lower jaw section | 207 | jaw pad |
| 208 | dowel pin | 209 | dowel pin |
| 210 | dowel pin | 211 | top jig edge |
| 212 | jaw pad | 215 | fixed jaw |
| 216 | drill guide bore | 217 | drill guide bore |
| 218 | drill guide bore | 219 | drill guide bore |
| 220 | drill guide bore | 221 | drill guide bore |
| 223 | jaw pad mounting hole | 224 | left vise support shaft |
| 225 | right vise support shaft | | |
| FIG. 10 | | | |
| 502 | jig jaw pad | 504 | stepped drill bit |
| 505 | stop collar | 506 | work support ledge |
| 507 | jaw pad | 508 | adjustment groove |
| 509 | adjustment groove | 510 | adjustment groove |
| 529 | drill bushing | | |
| FIG. 11 | | | |
| 402 | jig jaw pad | 404 | stepped drill bit |
| 405 | stop collar | 506 | work support ledge |
| 407 | jaw pad | 408 | adjustment groove |
| 409 | adjustment groove | 410 | adjustment groove |
| 429 | drill bushing | | |
| FIG. 12 | | | |
| 602 | jig jaw pad | 603 | drill guide |
| 604 | indexing pins | 605 | indexing holes |
| 606 | material alignment pad | 607 | alignment pins |
| 608 | pad alignment holes | 609 | material support pins |
| 610 | primary movable jaw pad | 611 | primary fixed jaw pad |

-continued

Figure 12A:
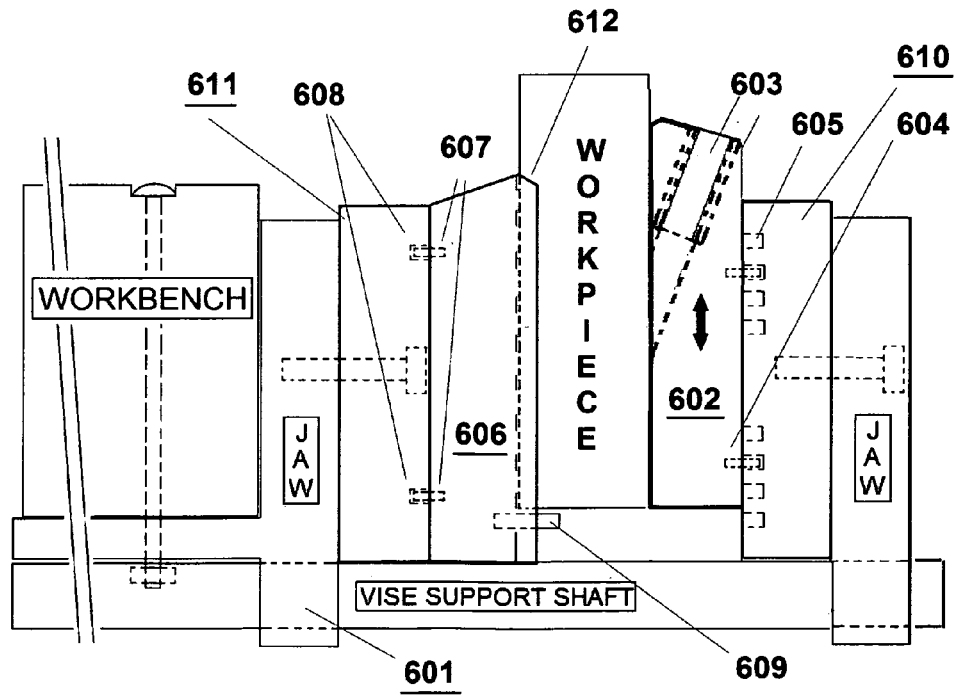
FIG. 12a is the same side elevation of the embodiment of FIG. 12 showing the jig jaw pad adjusted higher for use when working with thicker material.
Figure 12B:
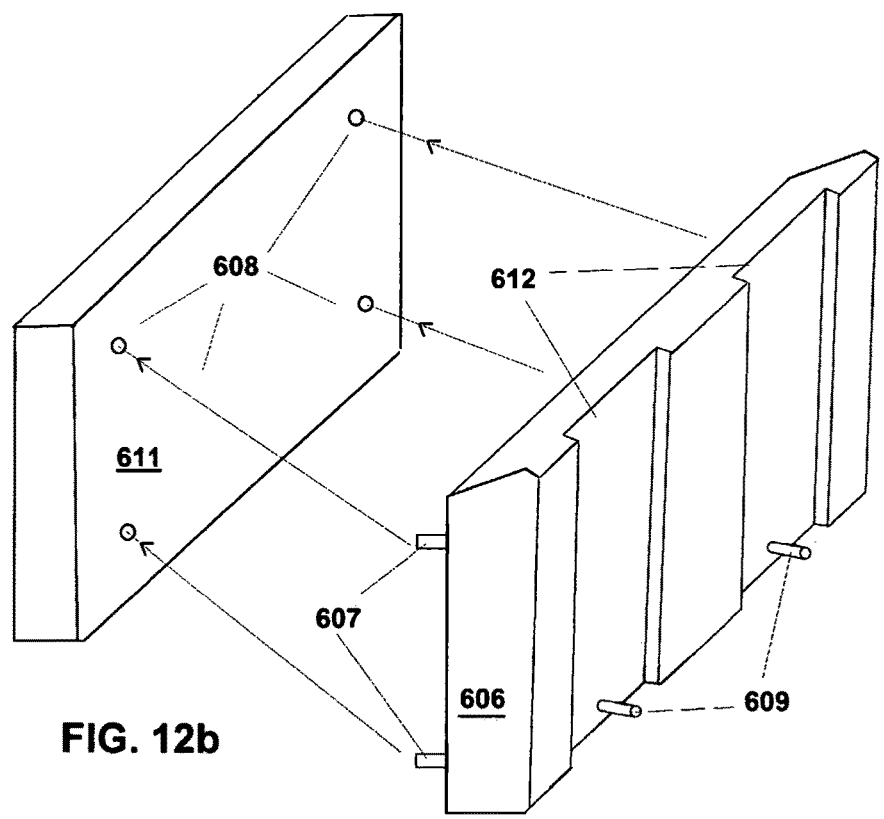
FIG. 12b is a perspective view showing alternate primary fixed jaw pad 611 for the fixed vise jaw and alternate work support and alignment union as shown in FIG. 12.

DRAWINGS - Reference Numerals 612  material recess (see FIG. 12b)

FIG. 12a

| 602 | jig jaw pad | 603 | drill guide |
| 604 | indexing pins | 605 | indexing holes |
| 606 | material alignment pad | 607 | alignment pins |
| 608 | pad alignment holes | 609 | material support pins |
| 610 | primary movable jaw pad | 611 | primary fixed jaw pad |
| 612 | material recess (see FIG. 12b) | | |

FIG. 12b

| 606 | material alignment pad | 607 | pad alignment pins |
| 608 | pad alignment holes | 609 | material support pins |
| 611 | primary fixed jaw pad | 612 | material recess |

FIG. 12c

| 602 | jig jaw pad | 603 | drill guide |
| 604 | indexing pins | 606 | material alignment pad |
| 607 | alignment pins | 609 | material support pins |
| 612 | material recess | | |

FIG. 12d

| 602 | jig jaw pad | 603 | drill guide |
| 604 | indexing pins | 605 | indexing hole |
| 610 | primary movable jaw pad | | |

DETAILED DESCRIPTION

Figure 1:
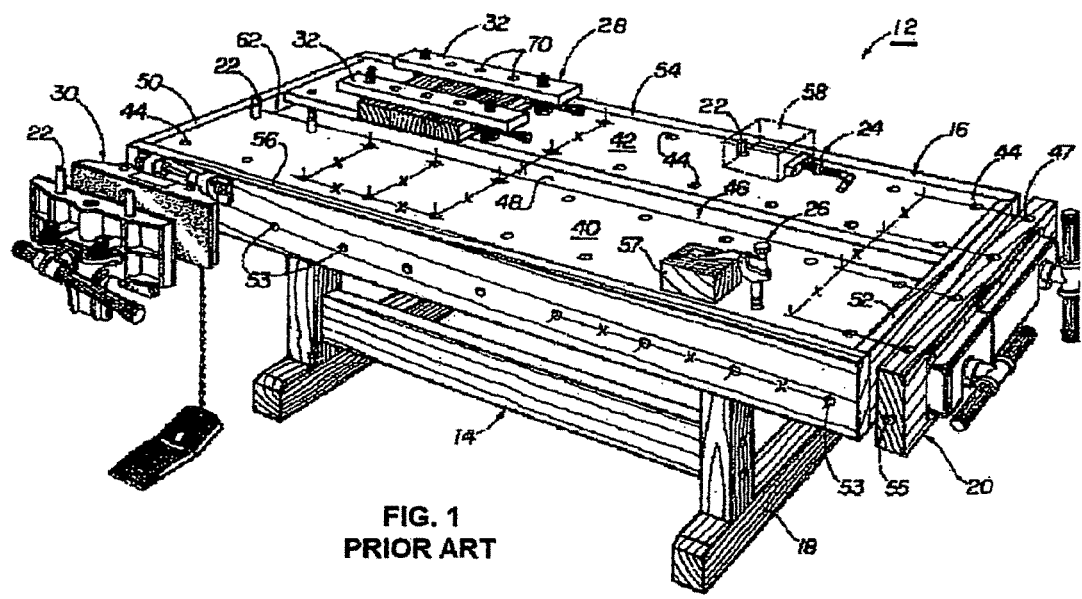
FIG. 1 is a perspective view of a prior art workbench which includes two woodworker's vises.
Figure 2:
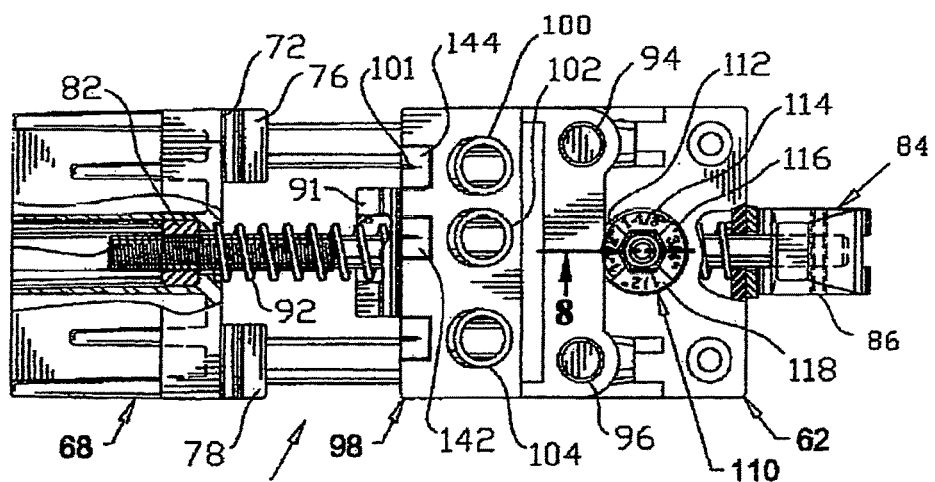
FIG. 2 is a perspective view of prior art pocket hole jig.

Referring now to Prior Art FIG. 1; Shown is a drawing (FIG. 1) disclosed in U.S. Pat. No. 5,284,331, this drawing shows a workbench with two woodworking vises attached to the bench. This drawing provides a good example of how such vises are typically located and mounted upon the edges of a workbench. The drawing also discloses holes (for bench dogs 22) along the top edge of a vise jaw and holes 47 and 55 in the edges of a jaw pad. The holes disclosed therein are designed to accept bench dogs used for clamping and have no capability or purpose regarding pocket hole joinery Referring now to Prior Art FIG. 2; Shown is a drawing (FIG. 6) disclosed in U.S. Pat. No. 6,637,988B1, this drawing shows a pocket hole jig wherein a guide carrier 98 supports thereon three drill guide bushings 100,102 and 104. A workpiece 74 is secured within the pocket hole drilling fixture 60. This fixture is a relatively complex device with many individual parts and while it may presumably have some occasional secondary use as a clamping device it cannot meet the robust work holding requirements needed to perform as a woodworking vise. It is essentially a dedicated pocket hole jig.

Figure 3:
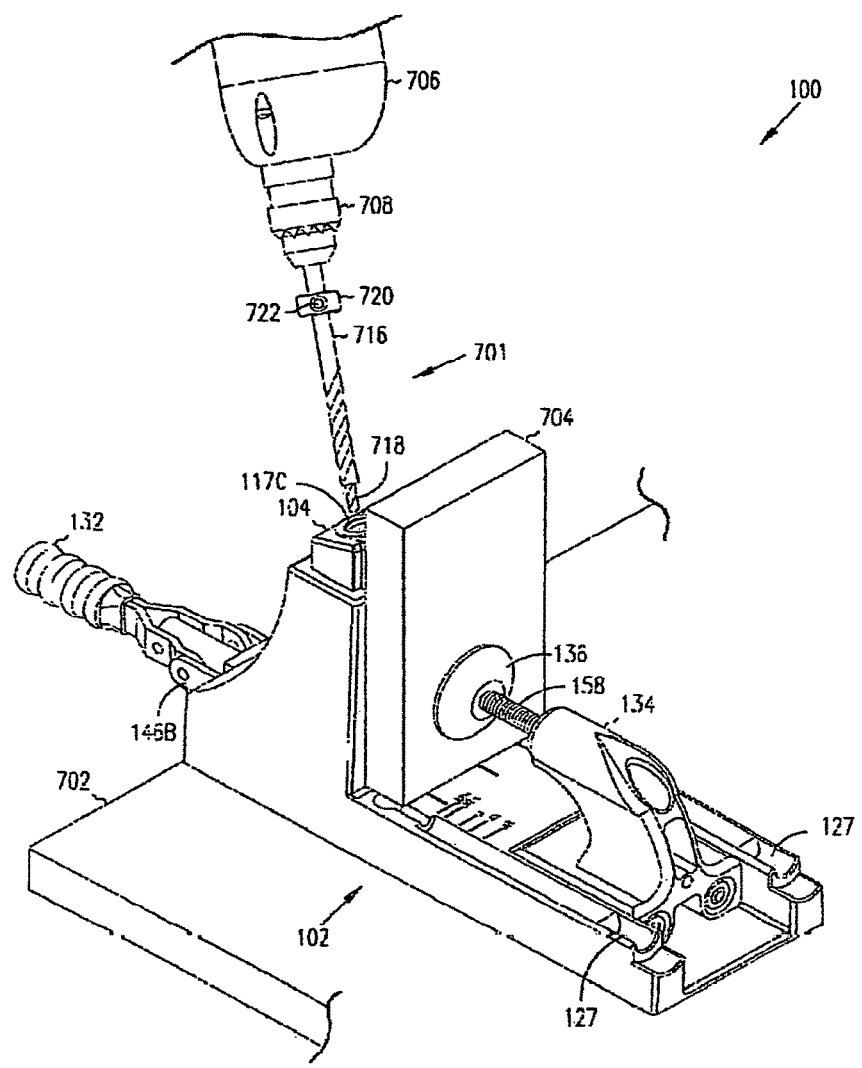
FIG. 3 is a perspective view of another prior art pocket hole jig.

Referring now to Prior Art FIG. 3; Shown is a drawing (FIG. 7b) disclosed in U.S. Pat. No. 7,641,425. As shown in that FIG. 7b drawing the adjustable holding system 100 is a dedicated pocket hole jig. While it is presumably possible to use the fixture as a clamp it is nevertheless made for only one purpose, pocket hole joinery. It cannot meet the robust workholding requirements needed to also perform as a woodworking vise.

Figure 4:
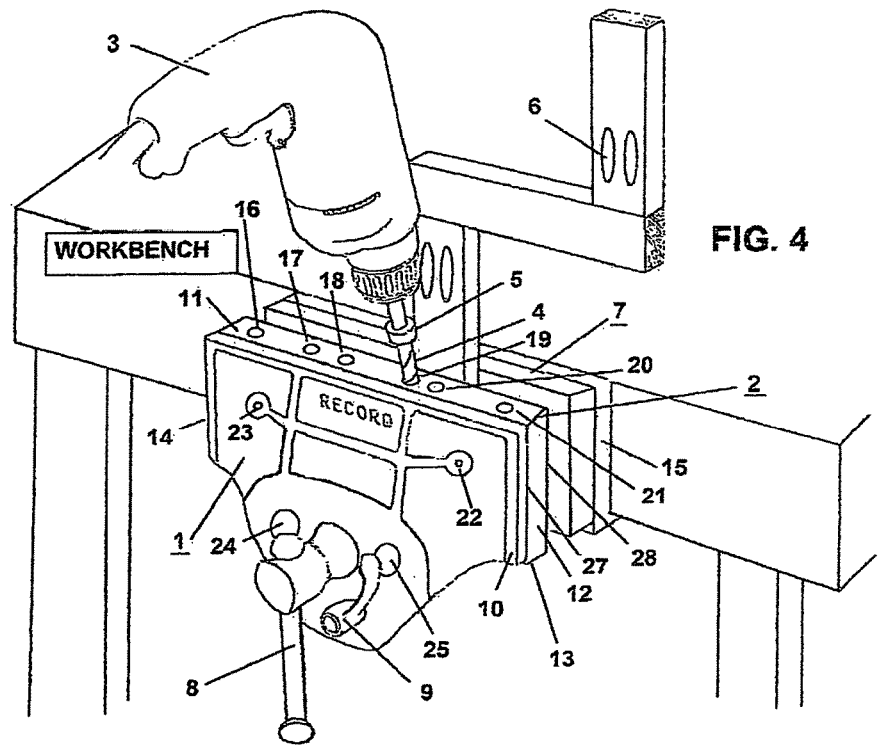
FIG. 4 is a perspective view of a woodworker's vise with a jaw pad having integral pocket hole drill guides.

FIG. 4 is a perspective view of a woodworker's vise 1 attached to a workbench, FIG. 4-6c represent the same embodiment. A typical vise 1 well known in the art has a movable jaw 10 and a fixed jaw 15. Fixed jaw 15 also includes as a part thereof a mounting bracket for securely attaching the vise 1 to the bench. Typically the front movable jaw 10 has two jaw pad mounting holes 22 and 23. The movable jaw 10 is slidably connected to the fixed jaw 15 by left support shaft 24 and right support shaft 25. The jaws 10 and 15 are opened and closed by turning handle 8 which is connected to main vise screw 26 (not shown in this view, see FIG. 5). The vise 1 may also have a quick adjust lever 9 which provides rapid jaw 10,15 adjustment. jig jaw pad 2 typically has a rectangular shape which includes a top edge 11, a right side edge 12, a bottom edge 13 and a left side edge 14. Jig jaw pad 2 also has a front side 27 which faces movable jaw 10, and a back side 28 which faces fixed jaw 15. A non-marring jaw pad 7 covers the clamping face of fixed jaw 15. In this embodiment jig jaw pad 2 has six drill guide bore(s) 16,17,18,19,20,21 holes entering top edge 11 at a known angle (typically 15°) towards back side 28. The spacing between the bore holes may be arranged to provide proper spacing for the most commonly used drill patterns, indicia (not shown) may be provided for easily positioning material within the vise 1. For example, drill guide bore 17 and drill guide bore 18 may be spaced apart to provide a proper drill pattern for use with material 2" wide while drill guide bore 19 and 20 may be located to produce a closer drill pattern to be used with 1.5" wide material. An example of such a pocket hole 6 pattern is shown in the workpiece held within vise 1 in FIG. 4. It should also be noted, the center point between drill guide bore 17 and drill guide bore 18 should be aligned above the center point of left vise support shaft 24 so that the top of shaft 24 acts as a reference and support point for a workpiece as it is inserted within vise 1 during the pocket hole setup. Likewise the same applies to drill guide bore 19 and 20 relative to shaft 25. The two drill guide bore(s) 16 and 21 which are spaced the furthest apart are useful for producing pocket holes in larger panels such as cabinet parts which require more pocket holes with a greater distance between each hole. Here larger panels are supported by both shafts 24 and 25 of the vise 1. Alternate workpiece supports (not shown) may be used to reference and support the workpiece within the vise 1. For example a simple ledge may be provided between the bottom of jig jaw pad 2 and the top of shafts 24 and 25. Although this discussion sets forth a particular arrangement of drill guide bore(s) others are of course possible. A power drill 3 is used with a stepped drill bit 4 to produce the actual pocket hole 6 in a workpiece. A stepped drill bit 4 equipped with a stop collar 5 which controls the depth of the bore is used to drill the pocket hole 6.

Figure 5:
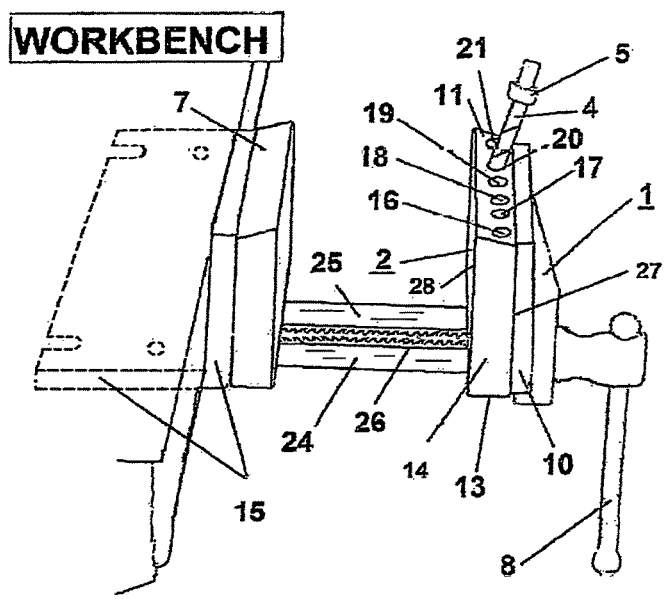
FIG. 5 is a perspective view of the same embodiment shown in FIG. 4 shown from the left side.

FIG. 5 is a perspective view of the left side of the same embodiment shown in FIG. 4. This view shows the main vise screw 26 and a clearer view of vise support shafts 24 and 25. Also shown in phantom is the bench mounting portion of fixed jaw 15. The angled entry of stepped drill bit 4 can also be seen relative to the jig jaw pad 2.

Figure 6:
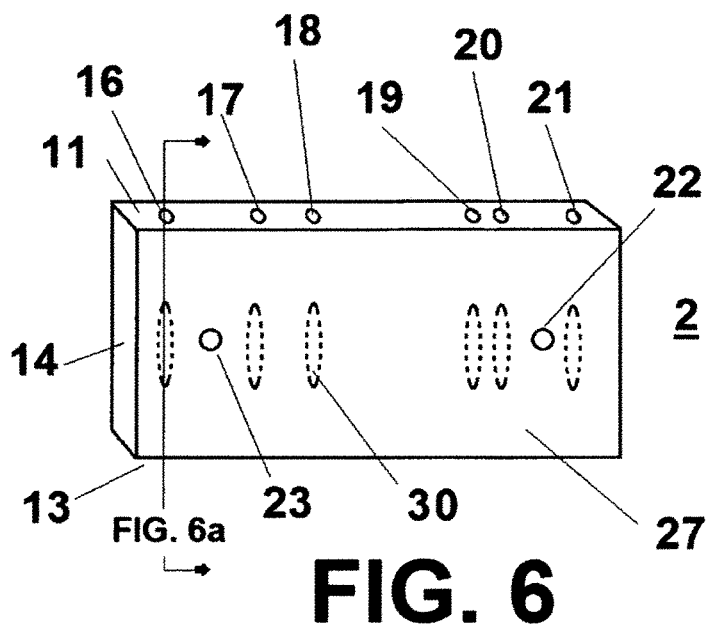
FIG. 6 is a perspective view of the front side of the jaw pad shown in FIGS. 4 and 5.

FIG. 6 is a perspective view of jig jaw pad 2 of FIG. 4-5 looking at it from front side 27. Jaw pad mounting hole(s) 22 and 23 may be used to attach jig jaw pad 2 to jaw 10 of vise 1. Hole(s) 22 and 23 may be provided with or without threads or no holes may be provided leaving any attachment option to the end user. A typical exit hole 30 is shown in phantom on back side 28 of jig jaw pad 2. It should be understood that exit hole(s) 30 as discussed herein begin from the bottom of drill bushing 29 (see FIG. 6a). Exit hole(s) 30 on the back side of jig jaw pad 2 should be the diameter of stepped drill bit 4 and not the O.D. Diameter of drill bushing 29. It is suggested that the drilling of exit hole(s) 30 be completed by the end user with a scrape block clamped securely within vise 1 thereby producing clean exit hole 30 on the backside of jig jaw pad 2, this in turn will produce clean pocket hole(s) 6 in subsequent workpieces. This procedure is not required if such observation is adhered to during manufacture. Particular drill patterns of bores 16-21 are discussed above however, drill patterns are essentially infinite.

Figure 6A:
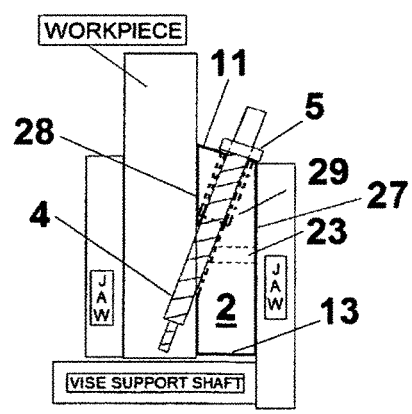
FIG. 6a is a side view of the jaw pad shown in FIG. 6.

FIG. 6a is a cross-section view showing the angled entry of stepped drill bit 4, also shown is stop collar 5. The adjustable stop collar 5 controls the depth of pocket hole 6, the collar has a set screw (not shown). Stepped drill bit 4, stop collar 5 and jig setup parameters of pocket hole joinery are well known in the art. Different known setups produce known results. FIG. 6a shows the workpiece resting upon vise support shaft 23, in this embodiment shaft(s) 23 and 24 are used as the indexing point and support for the bottom of a workpiece so as to properly position a workpiece in vise 1 relative to the top of drill bushing 29. In simple terms a workpiece sits on top of shafts 23 and/or 24 as it is secured within jaws 10 and 15 of vise 1. In this embodiment jig jaw pad 2 may be used with a material thickness range (¾" to 1 1/16") commonly used for cabinet panels and frames. Further discussion of the setup follows in the OPERATION section below. Such an embodiment can be retrofitted into virtually any vise without any interference to the normal operation of vise 1. Jig jaw pad 2 simply performs as a non-marring jaw pad while simultaneously providing the benefits of a pocket hole jig whenever needed.

Figure 6B:
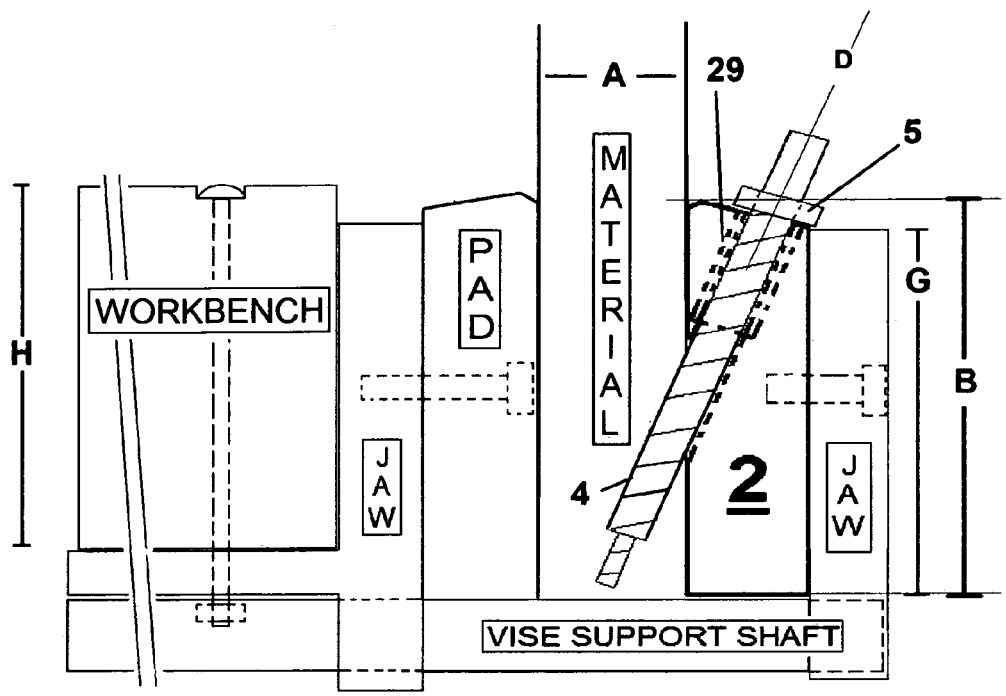
FIG. 6b is a side elevation of a jig jaw pad and labeled vise components of the same embodiment of FIG. 6

FIG. 6b is a side view elevation of the embodiment shown in FIG. 4-6c. FIG. 6b shows the various parts of a woodworker's vise labeled for simplicity and clarity. In FIG. 6b reference letter A indicates material thickness. This embodiment has a performance range useful for the most commonly used material thicknesses ¾" to 1 1/16". Reference letter B represents the height of jig jaw pad 2, B=4¼". Woodworking vises vary in size, however the dimensions discussed in this paragraph and the paragraph below produce a jig jaw pad 2 that can be used in a large vise or a small vise. Typically the top of jaws 10 and 15 should be about ½" below the top of the workbench. The top of jig jaw pad 2 and jaw pad 7 should be higher than the top of jaws 10 and 15 but slightly below the top of the workbench. The embodiment discussed in FIGS. 4-6c and shown in FIGS. 4-5 shows jig jaw pad 2 used in a larger vise (Record model #53). When jig jaw pad 2 is used in a smaller vise where the jaw height represented by reference letter G is substantially less than the height B of jig jaw pad 2 shims may be used as needed to relocate vise 1 relative to the top of the workbench so that the top of jig jaw pad 2 remains slightly below the top of the workbench. In the alternative a smaller vise 1 may be keep in its original position relative to the workbench and jig jaw pad 2 may be used and removed as needed. As is typical the thickness of the workbench represented by H determines the proper mounting of the vise 1.

Figure 6C:
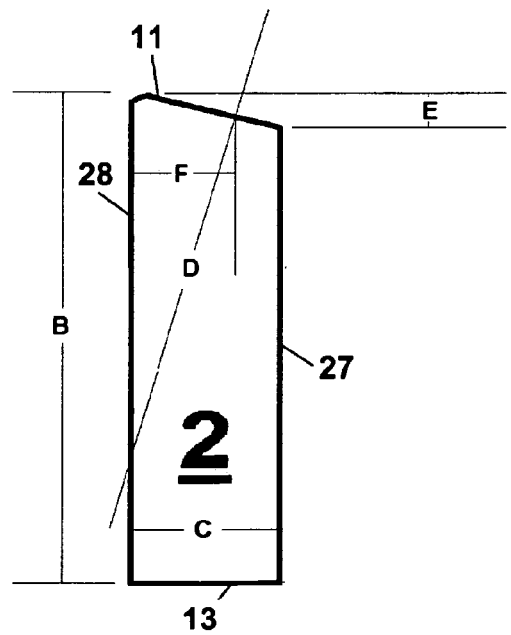
FIG. 6c is a side elevation of the jig jaw pad showing reference letters.

FIG. 6c shows an end view elevation of jig jaw pad 2 indicating front side 27, back side 28, top edge 11 and bottom edge 13. Reference letter C represents the thickness of jig jaw pad 2, C=1⅛". The angle represented by reference letter E is 15°, this angle allows top edge 11 to remain perpendicular to the bit entry angle represented by reference letter D which is also 15°, this permits the stop collar 5 to squarely contact the top of the drill bushing 29. Reference letter D also represents the center line of the drill bushing 29. Reference letter F represents the distance between the center line of the drill bushing 29 and back side 28 of jig jaw pad 2, F=⅝". Although this embodiment is discussed with specific dimensions it should be noted that they are nominal. During design and production basic known pocket hole geometry will assure optimum parameters.

FIG. 7 is a perspective view of a vertically adjustable embodiment of jig jaw pad 302 looking at it from left side 314. jig jaw pad 302 mounting holes are used to attach jig jaw pad 302 to movable jaw 310 of vise 301. The mounting holes are slotted and shouldered forming adjustment slot(s) 322 and 323 thereby permitting vertical adjustment of jig jaw pad 302. This adjustment allows jig jaw pad 302 to be moved vertically relative to support shaft(s) 324 and 325 upon mounting bolts. This adjustment allows jig jaw pad 302 to be positioned and tightened against movable jaw 310 and repositioned as needed to properly locate pocket holes within material of different thicknesses. There are exit hole(s) 330 (see FIG. 7b) on back side 328 of jig jaw pad 302. It should be understood that exit hole(s) 330 as discussed herein begin from the bottom of the drill bushing 329 (see FIG. 7a). The exit hole(s) 330 on the back side 328 of jig jaw pad 302 should be the diameter of the stepped drill bit 304 and not the O.D. Diameter of the drill bushing 329. For example the O.D. of drill bushing 329 is typically ½" and the diameter of the drill bit 304 is ⅜" thereby producing a ⅜" exit hole 330. It is suggested that the drilling of exit hole(s) 330 be completed by the end user with a scrape block clamped securely within the vise 301 thereby producing clean exit hole(s) 330 on the backside 328 of jig jaw pad 302, this in turn will produce clean pocket hole(s) in subsequent workpieces. Of course this procedure is not required if such observation is adhered to during manufacture. General bore locations are discussed above however drill guide bore(s) can be located anywhere along any edge(s) of jig jaw pad 302, therefore drill patterns are essentially infinite. Such an embodiment can be retrofitted for use with virtually any vise without interference to the normal operation of the vise thereby producing a vise which serves both as a work holding device and as an extremely robust pocket hole jig.

FIG. 7a is a cross-sectional view of FIG. 7b cut along the line shown. From this view it can be seen how jig jaw pad 302 can be vertically adjusted and secured to jaw vise 310 relative to vise support shaft 324. Once again as stated above, the workpiece is supported on top of shafts 324 and/or 325 as it is secured within the jaws 310 and 315 of the vise 301. The top of shafts 323 and/or 324 serve as bottom supports for workpieces when inserted within the vise 301.

FIG. 7b shows an embodiment of jig jaw pad 302 looking at it from front side 327. Mounting holes are provided as shouldered adjustment slots 322 and 323 permitting vertical adjustment upon mounting bolts which tighten and secure jig jaw pad 302 to jaw 310. By increasing the distance between the top edge 311 of jig jaw pad 302 and the top of shafts 324 and/or 325 the top edge 311 of movable jaw 310 can be variably positioned then secured to properly locate pocket holes within materials of different thicknesses. To properly locate pocket holes in thicker materials the higher top edge 311 must be above support shaft(s) 324 and/or 325.

FIG. 8 is a perspective view of an alternate embodiment showing a woodworker's vise 101 with an integral pocket hole jig incorporated within top edge 111 of movable jaw 110. The jig as shown has six drill guide bores 116-121 however it may incorporate more or less drill guide(s), likewise it may have drill guide(s) in any edge of either jaw. A standard non-marring jaw pad 112 may be added as usual to both fixed jaw 107 and movable jaw 110. Exit holes (not shown) can be bored through jaw pad 112 by clamping a scrape piece of material within the vise then drilling clean exit holes as discussed above. Such an embodiment may be incorporated into vises made subsequent to this disclosure, without interference to the normal operation of the vise.

FIG. 9 is a perspective view of yet another alternate embodiment showing a woodworker's vise 201 with an integral pocket hole jig incorporated within top edge 211 of movable jaw 210. The jig shown has six drill guide bores 216-221 however it may incorporate more or less drill guide(s), likewise it may have drill guide(s) incorporated within any edge of either jaw. Standard non-marring jaw pads 212 and 207 may be added as usual to both fixed jaw 215 and movable jaw 210. Jaw pad 212 should be attached only to upper jaw section 202, this permits it to move freely with section 202 as it is vertically adjusted. Exit holes (not shown) can be bored through jaw pad 212 by clamping a scrape piece of material within the vise then drilling clean exit holes as discussed above. This embodiment permits top edge 211 of movable jaw 210 to be vertically adjusted. By increasing the space between the top edge 211 of movable jaw 210 and the top of shafts 224 and/or 225 the top edge 211 of movable jaw 210 can be variably positioned then secured to properly locate pocket holes within thicker materials. To properly locate pocket holes in thicker materials the higher top edge 211 must be above support shaft(s) 224 and/or 225. Such vertical adjustment may be accomplished for example, by slidably mounting the upper section of movable jaw 210 upon dowel pins 208, 209 and 210 permitting it to be raised or lowered relative to support shaft(s) 224 and/or 225 as needed. A locking set screw (not shown) may be added to maintain any vertical position. Such an embodiment may be incorporated into vises made subsequent to this disclosure, without interference to the normal operation of the vise.

FIG. 10 is a side view elevation of an alternate embodiment jig jaw pad 502 showing an optional work support ledge 506. FIG. 10 also shows the various parts of a woodworker's vise labeled for simplicity and clarity. Ledge 506 may be adjustably relocated by inserting the ledge 506 within different grooves 508, 509, 510 as needed relative to the thickness of material (A). Grooves 508, 509, 510 are simply thin, shallow channels within the work contacting surface of the jig jaw pad 502 running parallel its top edge. The ledge 506 may be any thin, rigid material which fits snugly within the groove. The greater the distance between the top of jig jaw pad 502 and the top of the work support surface, which may be the top of the vise support shafts or the top of ledge 506, the thicker the material to be bored may be. Proper adjustment of stepped drill bit 504 and stop collar 505 relative to different material thickness represented by letter A is required for proper pocket hole positioning. See step 1 in OPERATIONS section below for proper drill/collar setup.

Figure 10A:
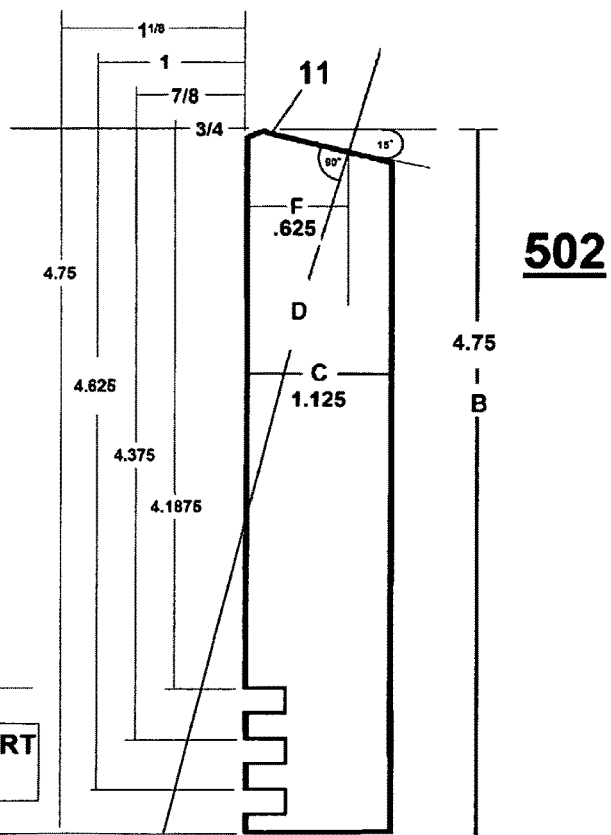
FIG. 10a is a side elevation of the embodiment of FIG. 10 showing a graph indicating typical setup parameters.

FIG. 10a is a side elevation of jig jaw pad 502 showing a graph with typical setup parameters. Approximately each ⅛" decrease in material thickness translates into a 3/16" increase in the height of the work support surface. The top of the vise support shaft represents the lowest work support surface. The material thickness range using this embodiment is ¾" to 1⅛".

FIG. 11 is a side view elevation of an alternate embodiment jaw pad 407 showing an optional work support ledge 406. This option provides adjustable work support positions like those shown in FIG. 10 except the grooves 408, 409, 410 are provided in jaw 407 instead of in jig jaw pad 402. In the example shown in FIG. 10 and FIG. 11 three grooves are shown, more or less may be used. FIG. 6b also shows the various parts of a woodworker's vise labeled for simplicity and clarity.

FIG. 12 is a side view elevation of an alternate embodiment jig jaw pad 602 and material alignment pad 606. This drawing also shows a primary fixed jaw pad 611 and a primary movable jaw pad 605. Primary pads 611 and 605 should be the same size and can be produced to fit any size vise. NOTE: Fixed jaw pad 611 refers to the jaw pad which attaches to the fixed jaw of the vise and movable jaw pad 605 refers to the jaw pad that attaches to the movable jaw of a vise. In this embodiment jaw pads 611 and 605 remain permanently attached to the jaws of the vise and are removed and replaced only when damaged or worn just like any other standard jaw pad. FIG. 12 also shows the various parts of a woodworker's vise labeled for simplicity and clarity. Jaw pads 611 and 610 are shown bolted to the fixed and movable jaws of the vise, however any suitable method of firmly attaching pads 611 and 610 to the vise jaws will suffice. Use of industrial grade double face tape (i.e. 3M Scotch #468) in place of bolts facilitates universal mounting of pads 611 and 610 to the jaws of any vise. Fixed jaw pad 611 includes alignment holes 608 which receive alignment pins 607 that protrude from the back side of material alignment pad 606. This union provides consistent positioning of jaw pad 611 and material alignment pad 606 relative to each other. The alignment holes 608 and alignment pins 607 or any other suitable union should provide a snug lateral connection both horizontally and vertically between pad 611 and pad 606 while also providing firm attachment yet easy removal of material alignment pad 606 to and from pad 611 as needed. Material alignment pad 606 may include 1 or more material recesses 612. Each recess 612 includes a material support pin 609 which both supports and references the bottom of the workpiece relative to the top of jig jaw pad 602. (See FIGS. 12b and 12c for clarity) Primary movable jaw pad 610 attaches to the movable jaw of the vise in the same manner as described above for pad 611. Similarly jig jaw pad 602 attaches to primary movable jaw pad 610 as described above except here indexing pins 604 may mate with any indexing hole 605 within the vertical series of indexing holes 605. This indexing arrangement allows the jig jaw pad 602 to be vertically raised or lower relative to primary pad 605 as needed based on the thickness of the workpiece to be bored. During design and production basic known pocket hole geometry will provide the proper location of material support pins 609 relative to the top of drill guides 603.

NOTE: In this embodiment it is recommended that jig jaw pad 602 and material alignment pad 606 be made approximately 1" wider than primary pads 610 and 611. This extra width provides ½" overhang on each side thereby providing a gripping area to facilitate easy separation and removal of pads 602 and 606 from primary pads 610 and 611.

FIG. 12a is the same view of the embodiment shown in FIG. 12. In this drawing jig jaw pad 602 is shown in a higher position relative to primary movable jaw pad 605 and material support pin 609.

FIG. 12b is a perspective view of primary fixed jaw pad 611 and material alignment pad 606. Pad 611 includes 4 alignment holes 608 that mate with 4 alignment pins 607 which protrude from the back side of material alignment pad 606. This union permits proper alignment of jaw pad 611 and alignment pad 606. Other alignment arrangements may be used instead of pins 607 and holes 608 provided they facilitate proper alignment and ease of attachment/removal relative to jaw pad 611 and alignment pad 606. In this example material alignment pad 606 shows two material recesses 612, more or less may be provided. Material support pins 609 are shown as round pins as such they discourage the accumulation of cutting debris upon their top surface permitting more clean and accurate reference of the workpiece upon its surface.

Figure 12C:
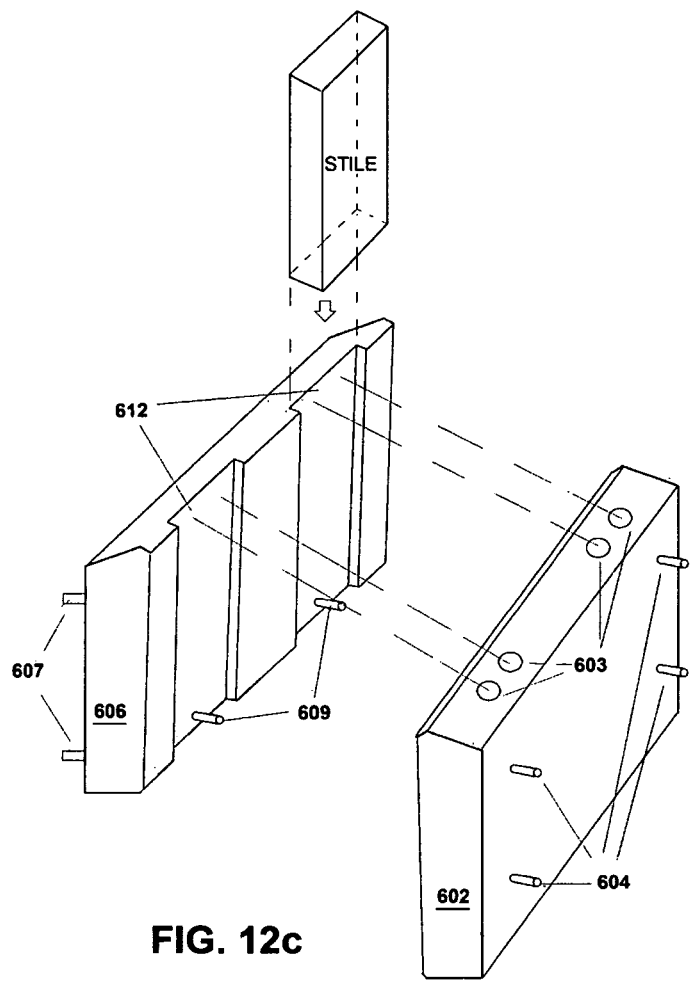
FIG. 12c is a perspective view showing material alignment pad 606 as it relates to jig jaw pad 602.

FIG. 12c is a perspective view of material alignment pad 606 and jig jaw pad 602. Material alignment pad 606 is shown here with 2 material recesses 612 as an example for discussion only, more or less may be provided. In this example jig jaw pad 602 shows 2 sets of drill guides 603 patterned along the top edge of jig jaw pad 602 to properly line up with the corresponding recesses contained within pad 606. Such proper alignment produces consistently spaced and located pocket holes in the material eliminating the need for measuring and marking individual workpieces. The dimensions of the material recess are nominal. The depth of the recess 612 should be deep enough to support the workpiece. The width of the recess 612 can be custom or standard based on common stile widths i.e. 2", 1.5" etc. Recesses 612 may be perpendicular or angled (for mitered work) relative to the top edge of jig jaw pad 602. Material support pins 609 should protrude slightly beyond the depth of the recess so that they may support and reference the bottom of larger panel type material i.e. cabinet tops or bottoms which would not fit within the recesses 612. Material support pins 609 are shown as round pins as such they discourage the accumulation of cutting debris upon their top surface permitting more clean and accurate reference of the workpiece upon its surface.

Figure 12D:
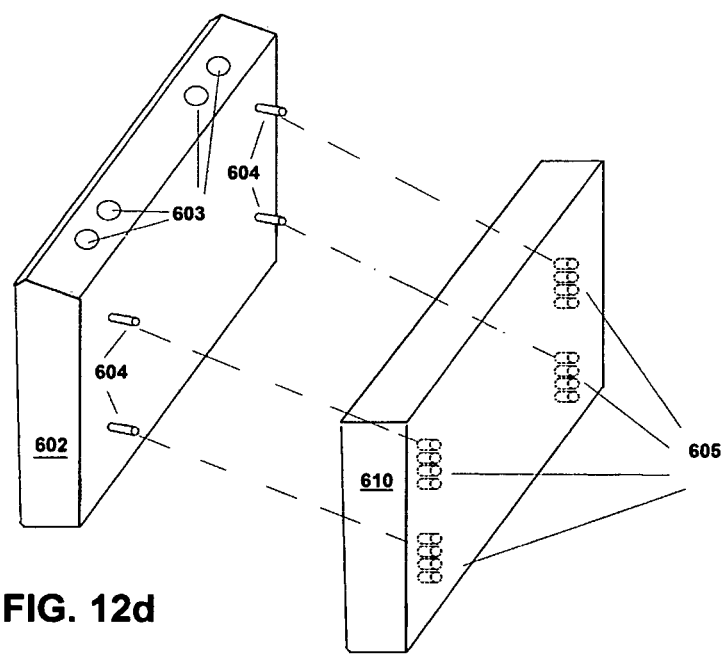
FIG. 12d is a perspective view showing jig jaw pad 602 as it relates to primary movable jaw pad 605.

FIG. 12d is a perspective view of jig jaw pad 602 relative to primary movable jaw pad 610. Shown in this drawing is an example of how indexing pins 604 may be inserted into a corresponding indexing holes 605 within a vertical series of indexing holes 605. The indexing hole 605 selected for union with pin 604 is based on the desired position of jig jaw pad 602 relative to primary movable jaw pad 610, the desired position is based on the thickness of the workpiece.

Operation

Jig jaw pad 2 of the embodiment shown in FIG. 4-6c is attached to the movable jaw 10 of woodworker's vise 1 with the back side 28 facing the fixed jaw 15 of the vise 1. During operation one uses the vise 1 in the normal manner to secure the workpiece between jaws 10 and 15. To drill pocket holes 6 in material ranging from approximately ¾" to 1¹/₁₆" thick the embodiment shown in FIG. 4-6c or the embodiment shown in FIG. 8 may be used. The embodiments shown in FIG. 4-6c and FIG. 8 require no adjustment yet adequately accommodate the most commonly used materials thicknesses.

The following instruction would be typical:
  (1) Preset stepped drill bit 4 and stop collar 5 by inserting bit 4 into any drill guide nearest support shaft 24 or 25 so that it is slightly above the top of the shaft or alternate work support. Any rigid thin shim (¹/₁₆"-⅛") placed across support shafts 24 and 25 or on top of ledge support will aid in this adjustment. Let the tip of stepped drill bit 4 rest upon the shim then slide stop collar 5 over the top of bit 4 until it rests upon the top of drill bushing 29, then tighten stop collar 5 upon bit 4. Bit 4 and collar 5 are now properly set and the shim can be removed.
  (2) Adjust vise 1 to the approximate opening required based on the material thickness. Insert the material within jaws 10 and 15 of vise 1 so that the bottom of the workpiece rests on top of vise support shaft 24 or 25 which is located centered below the drill pattern.
  (3) While holding the workpiece reasonably perpendicular to top edge 11 of jig jaw pad 2 visually align the approximate center point of the workpiece with the approximate center point of the chosen drill guide pattern. For example: Use the two closest drill guides 19 and 20 for 1.5" wide material. Use drill guides 17 and 18 for material 2" wide. Use the two furthest drill guides 16 and 21 when drilling larger panels. Indicia may be provided to aid visual alignment of the drill pattern upon the workpiece.
  (4) Tighten the vise as usual securing the material.
  (5) Insert bit 4 into a power drill 3.
  (6) Insert bit 4 into the chosen drill guides and drill the pocket holes 6.
  (7) Slightly loosen vise 1 and remove the material, repeat process for the next piece as needed.

To drill pocket holes in material within a more varied thickness range the adjustable embodiments shown in FIG. 7, FIG. 9, FIG. 10, FIG. 11 or FIG. 12 may be used.
  (1) Determine material thickness.
  (2) Loosen mounting screws and raise jig jaw pad 302 of FIG. 7 or upper jaw section 202 of FIG. 9 to required height based on material thickness. Starting from the lowest position raise the jig jaw pad 302 or upper jaw section 202 of FIG. 9 in increments of approximately ³/₁₆" for each ⅛" increase in material thickness. Placing shims of different thicknesses between support shafts 324 and 325 and bottom edge 313 of jig jaw pad 302 will aid in proper vertical positioning of jig jaw pad 302. Likewise shimming between lower jaw section 203 and upper jaw section 202 will aid in adjustment when using the embodiment shown in FIG. 9. Such shims can be shop made as a simple set of wooden sticks of different thicknesses. Shims are removed once jig jaw pad 302 is properly adjusted and tightened in place. Shims may remain between upper jaw section 202 and lower jaw section 203 to maintain its position as gravity will hold upper jaw 202 in place and tightening the jaws of the vise will keep the sections properly adjusted. To properly adjust alternate work support ledge 406 or 506 shown in FIG. 10 and FIG. 11 respectively, insert ledge 406 or 506 within the required groove 408, 409, 410 or 508, 509, 510 respectively relative to material thickness. The thicker the material the lower the work support should be.
  (3) Follow instructions 1-7 as outline above.

Operation (Continued)

For the purpose of discussion the pocket hole system of the embodiment shown in FIG. 12-12d will be described using a typical large woodworker's vise, it can however be provided for use with any size vise. The following instruction would be typical for a universal installation of the system and use thereof.
  1) Peel protective coating off of double face tape which may be provided on primary movable jaw pad 610 and primary fixed jaw pad 611. Place jaw 611 and 610 with the un-taped sides together noting top and bottom of each. While holding all edges flush insert pads 610 and 611 between the slightly open jaws of the vise centering pads 610 and 611 upon the jaws with the bottom edge of pads 610 and 611 on top of the vise support shafts. Carefully and aggressively tighten the vise. Give the tape a few minutes to form a firm bond between the pads 610 and 611 and the jaws before opening the vise. Note: using a piece of paper as a shim between pad and vise shafts when attaching pads to jaws prevents the bottom of the fixed pad from rubbing on the vise shafts when the vise is opened and closed.
  2) With primary movable jaw pad 610 and primary fixed jaw pad 611 now firmly adhered to the jaws of the vise once again open the vise. The vise is now ready to use as always. Pads 610 and 611 now perform exactly like any other non-marring vise pad. To use the vise as a pocket hole jig proceed to step 3.

3) Attach material alignment pad 606 to primary fixed jaw pad 611 by inserting alignment pins 607 into corresponding pad alignment holes 608. Close the vise as needed to close any gap between pad 611 and 606.

4) Open the vise. Determine the thickness of the workpiece to be bored. Attach jig jaw pad 602 to primary movable jaw pad 610 by inserting indexing pins 604 into the corresponding indexing holes 605 which are chosen based on the material thickness. Close the vise as needed to close any gap between pad 602 and 605.

5) Open the vise just wide enough to insert the workpiece(s) within the material recesses 612 then tighten the vise as usual securing the material.

6) Properly set up stepped drill and stop collar based on material thickness and drill pocket holes.

7) To bore larger panels the recesses 612 are not used. Panels are supported by material support pins 609 and clamped and drilled as usual.

Advantages

This improved pocket hole drill guide system provides distinct and novel advantages when compared to prior art pocket-hole systems. By using this simple drilling fixture within a vise all the robust work holding capacities and capabilities inherent in vises become inherent in the system itself, without the need for additional apparatus. Such inherited benefits contribute and translate into increased production rates with less worker fatigue plus complete jig and workpiece stability hence increased safety. These and other benefits all contribute to making any vise an even more versatile piece of equipment. The addition of the vise fixture disclosed herein has no effect on the normal and typical use of a vise, therefore a vise can be used as usual or when needed as a high performance pocket hole jig.

Although the description above contains many specificities, those should not be construed as limiting the scope of embodiments but merely providing illustrations of some presently preferred embodiments.

I claim:

1. A pocket hole vise fixture, the fixture comprising:
   a) a broad, flat work contacting surface, the work contacting surface analogous to a clamping surface of a woodworking type vise having large opposing jaws, the work contacting surface further providing a large clamping surface to allow simultaneous restraint of two or more workpieces;
   b) a top edge providing ample linear length for a plurality of drill guide bores;
   c) at least two first drill guide bores situated on the top edge of the fixture and spaced along a line parallel to the top edge for drilling pocket holes in a first workpiece;
   d) at least two second drill guide bores situated on the top edge of the fixture and spaced along said line parallel to the top edge for drilling pocket holes in a second workpiece, said second drill guide bores spaced from said first drill guide bores such that they form discrete groups of drill guide bores for drilling pocket holes in separate workpieces;
   e) each drill guide bore disposed through said top edge at a known pocket hole angle toward said work contacting surface of said fixture.

2. The fixture of claim 1, wherein said fixture is usable with a woodworking vise.

3. The fixture of claim 1, wherein said fixture is integral to a woodworking vise.

4. A pocket hole vise fixture, the fixture comprising:
   a) a broad, flat work contacting surface, the work contacting surface analogous to a clamping surface of a woodworking type vise having large opposing jaws, the work contacting surface further providing a large clamping surface to allow simultaneous restraint of two or more workpieces;
   b) a top edge providing ample linear length for a plurality of drill guide bores;
   c) at least two first drill guide bores situated on the top edge of the fixture and spaced along a line parallel to the top edge for drilling pocket holes in a first workpiece;
   d) at least two second drill guide bores situated on the top edge of the fixture and spaced along said line parallel to the top edge for drilling pocket holes in a second workpiece, said second drill guide bores spaced from said first drill guide bores such that they form discrete groups of drill guide bores for drilling pocket holes in separate workpieces;
   e) said work contacting surface accommodating removable work support;
   f) each drill guide bore disposed through said top edge at a known pocket hole angle toward said work contacting surface of said fixture.

5. The fixture of claim 4, wherein said fixture is usable with a woodworking vise.

6. The fixture of claim 4, wherein said fixture is integral to a woodworking vise.

* * * * *